US012239102B1

(12) United States Patent
Luo (10) Patent No.: US 12,239,102 B1
(45) Date of Patent: Mar. 4, 2025

(54) ELECTRIC FENCE

(71) Applicant: Shenzhen Wellturn Technology Co., Ltd., Guangdong (CN)

(72) Inventor: Xingsheng Luo, Guangdong (CN)

(73) Assignee: Shenzhen Wellturn Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/764,240

(22) Filed: Jul. 4, 2024

Related U.S. Application Data (63) Continuation-in-part of application No. 18/493,011, filed on Oct. 24, 2023.

(30) Foreign Application Priority Data

Aug. 31, 2023 (CN) .......................... 202311130640.X (51) Int. Cl.
 *A01K 15/02* (2006.01)
(52) U.S. Cl.
 CPC .................................. *A01K 15/023* (2013.01)
(58) Field of Classification Search
 CPC .................................................... A01K 15/023
 USPC ....................................................... 340/573.3
 See application file for complete search history.

(56) References Cited

U.S. PATENT DOCUMENTS

| | | | | |
|---|---|---|---|---|
| 2011/0273300 | A1* | 11/2011 | Brommer | G06K 19/0723 340/573.3 |
| 2012/0069322 | A1* | 3/2012 | Kostamovaara | G01S 7/497 356/5.01 |
| 2015/0237834 | A1* | 8/2015 | Schab | G06N 20/10 340/573.3 |
| 2016/0015005 | A1* | 1/2016 | Brown, Jr. | G16H 40/67 340/573.3 |
| 2016/0165852 | A1* | 6/2016 | Goldfain | G06F 3/0481 340/573.3 |
| 2016/0363659 | A1* | 12/2016 | Mindell | G01S 13/66 |

* cited by examiner

*Primary Examiner* — Kerri L McNally

(57) ABSTRACT

The present disclosure an electric fence device, including a transmitter and at least one receiver. The transmitter includes a first integrated circuit board; wherein, the first integrated circuit board is arranged with a first radar module and a first wireless transceiver module. The at least one receiver is configured to be worn on a pet. The receiver comprises a second integrated circuit board; the second integrated circuit board is arranged with a second radar module and a second wireless transceiver module. The first radar module and the second radar module are communicatively connected to each other perform measurement signal transmission to determine a location of the pet; the first wireless transceiver module and the second wireless transceiver module are communicatively connected to each other to perform instruction signal transmission and data feedback.

20 Claims, 6 Drawing Sheets

ELECTRIC FENCE

CROSS REFERENCE TO RELATED APPLICATIONS

The present application is a continuation-in-part application of the U.S. patent application Ser. No. 18/493,011, filed on Oct. 24, 2023, and claims the priority of the Chinese patent application No. CN202311130640.X, filed on Aug. 31, 2023. Contents of which are incorporated herein by its entireties.

TECHNICAL FIELD

The present disclosure relates to the field of electric fences, and in particular to an electric fence.

BACKGROUND

A pet electric fence is configured to artificially set a virtual fence range to prevent a pet from escaping and protect safety of the pet. Usually, the usual electric fence consists of two parts. A first part is a transmitter, taking radio waves to form the virtual fence range. A second part is a receiver worn by the pet. The transmitter and the receiver operate cooperatively to monitor a location of the pet in real time. When the pet runs out of a boundary of the electric fence range, the receiver sends a warning signal. After training the pet for a certain period of time, the pet can understand where the boundary is and a penalty for exceeding the boundary, such that a probability of the pet escaping out of the electric fence range may be reduced.

In the art, each of the transmitter and the receiver is arranged with one wireless transceiver module for communication. By arranging one wireless transceiver module, the wireless transceiver module needs to transmit a measurement signal to locate the pet, transmit a instruction signal between the transmitter and the receiver, and perform data transmission between the transmitter and the receiver. The only one wireless transceiver module processes a plurality of signals simultaneously, and the plurality of signals may interfere with each other, resulting in significant signal delay and poor locating accuracy.

SUMMARY OF THE DISCLOSURE

The present disclosure an electric fence device, including a transmitter and at least one receiver. The transmitter includes a first integrated circuit board; wherein, the first integrated circuit board is arranged with a first radar module and a first wireless transceiver module. The at least one receiver is configured to be worn on a pet. The receiver comprises a second integrated circuit board; the second integrated circuit board is arranged with a second radar module and a second wireless transceiver module. The first radar module and the second radar module are communicatively connected to each other perform measurement signal transmission to determine a location of the pet; the first wireless transceiver module and the second wireless transceiver module are communicatively connected to each other to perform instruction signal transmission and data feedback.

DETAILED DESCRIPTION

In order to make purposes, features and advantages of the present disclosure more obvious and understandable, embodiments of the present disclosure will be described in detail by referring to the accompanying drawings in the following.

To be noted that the terms "first", "second", and so on, in the specification, claims and the accompanying drawings of the present disclosure are used to distinguish objects and shall not be interpreted as describing a particular order or sequence. To be understood that data used in such a way may be interchangeable, such that the embodiments of the present disclosure described herein can be implemented in an order other than those illustrated or described herein.

In the description of the present disclosure, it is to be noted that the terms "arranged", "mounted", "connected", "coupled" shall be understood in a broad sense, unless otherwise expressly specified and qualified. For example, connection may be fixed connection, detachable connection, configured as a one-piece structure; or mechanical connection; or direct connection, indirect connection through an intermediate medium; or connection within two elements. Any ordinary skilled person in the art shall understand the specific meaning of the above terms in the context of the present disclosure case by case.

In the description of the present disclosure, "embodiment", "one embodiment", "an embodiment", and so on, means that specific features, structures, materials, or properties described in an embodiment or implementation are included in at least one embodiment or implementation of the present disclosure. In the present specification, schematic expressions of the above terms do not necessarily refer to a same embodiment or implementation. Moreover, the described specific features, structures, materials, or properties may be combined in any one or more of the embodiments or implementations in a suitable manner.

The present disclosure will be described in detail below by referring to the accompanying drawings.

To solve the above technical problems, as shown in FIGS. 1, 2, 5, 8 and 9, the present disclosure provides an electric fence device including following structures.

Figure 1:
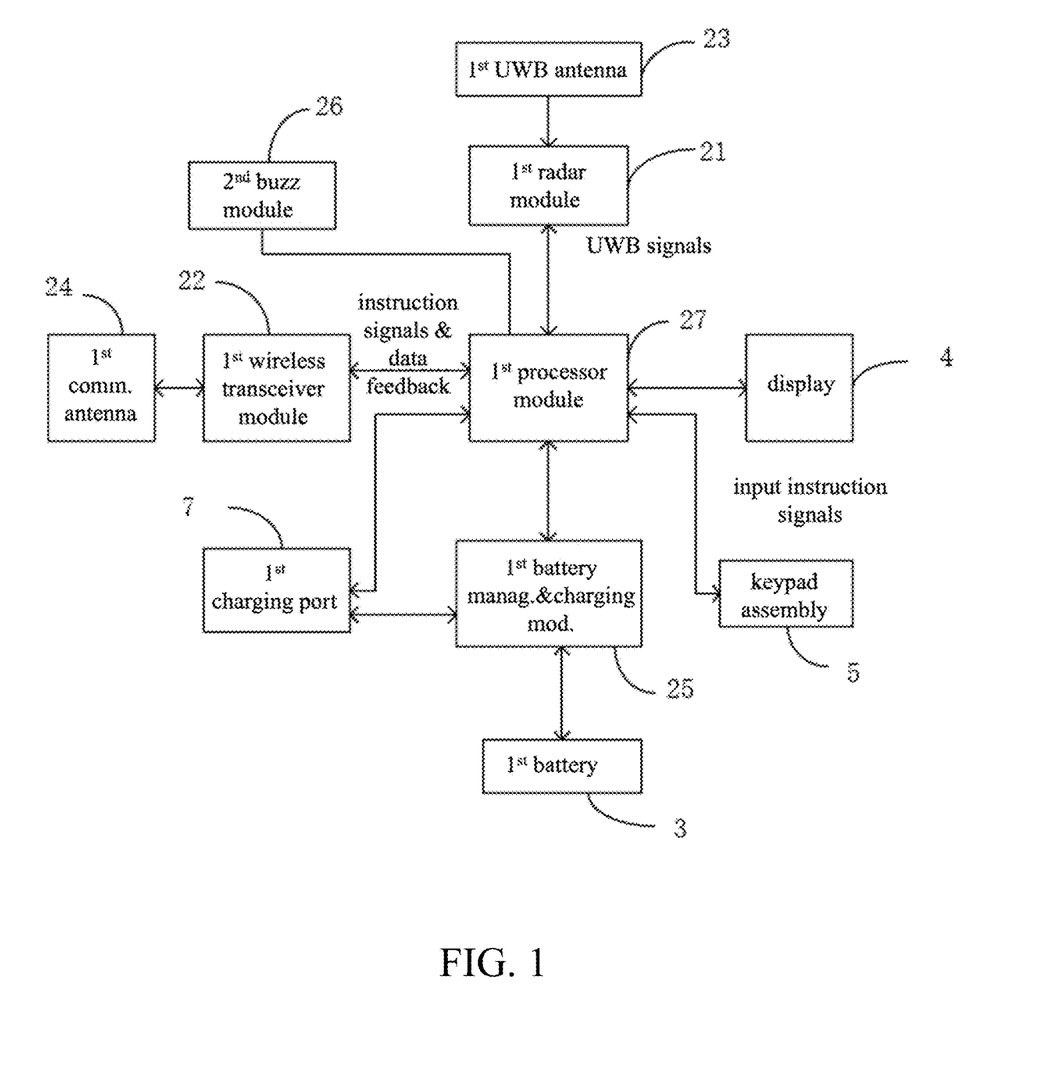
FIG. 1 is a structural schematic diagram of a transmitter according to an embodiment of the present disclosure.
Figure 5:
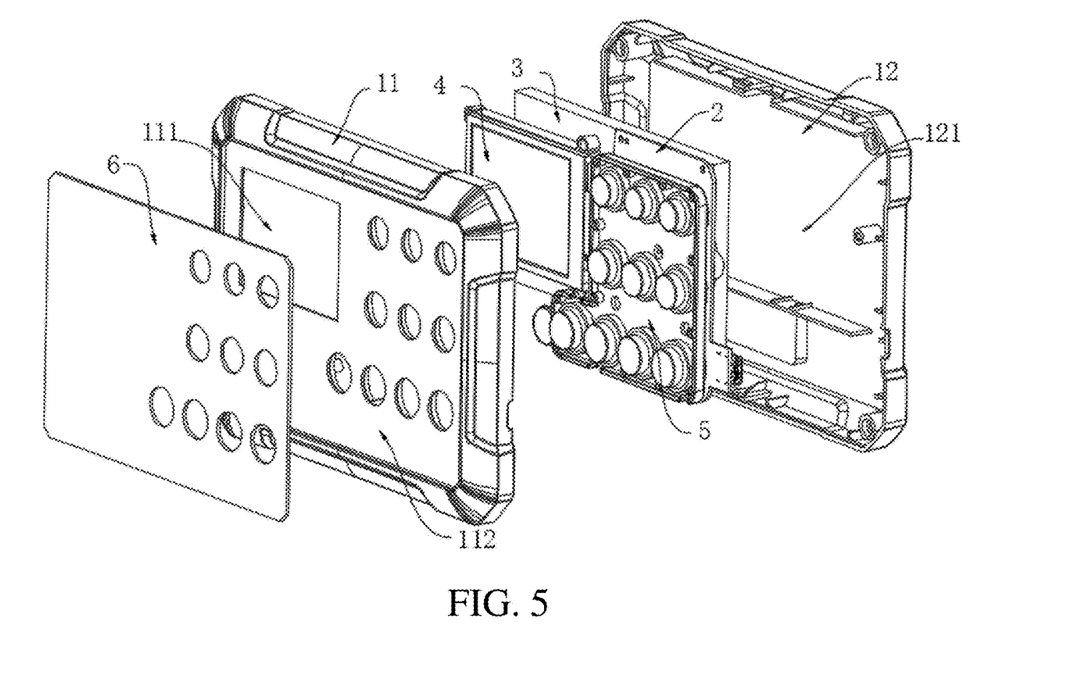
FIG. 5 is an exploded view of the transmitter according to an embodiment of the present disclosure.

A transmitter 100 is arranged and includes a first integrated circuit board 2. The first integrated circuit board 2 is arranged with a first radar module 21 and a first wireless transceiver module 22.

Figure 2:
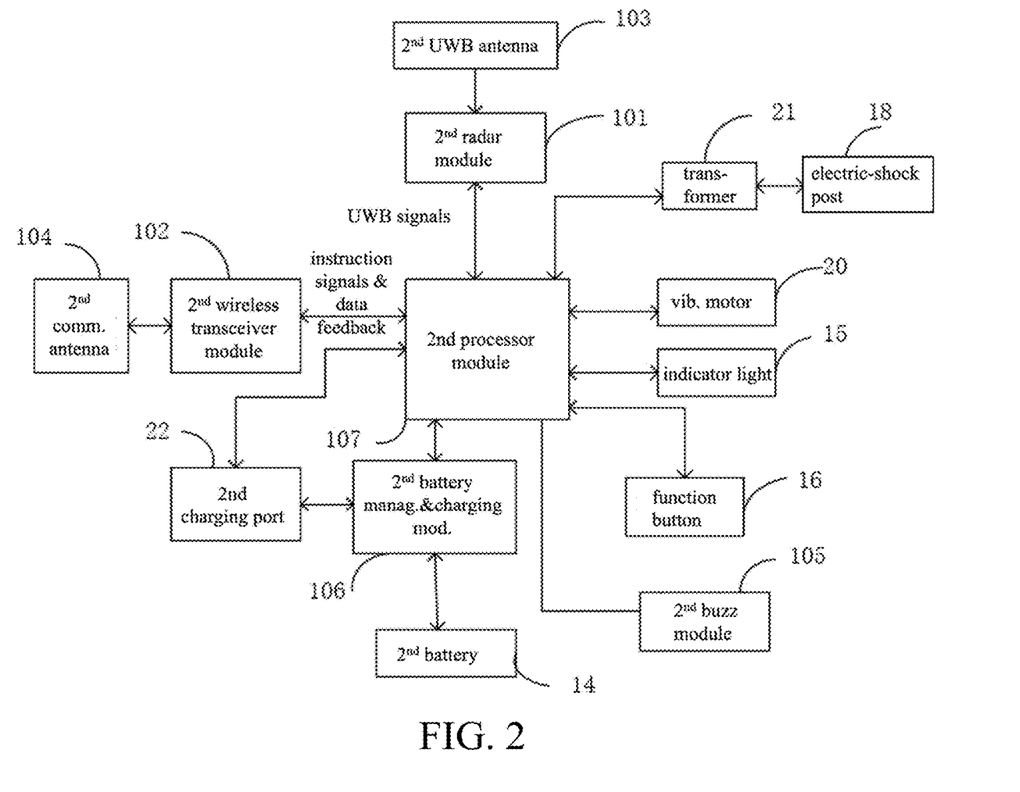
FIG. 2 is a structural schematic diagram of a receiver according to an embodiment of the present disclosure.
Figure 8:
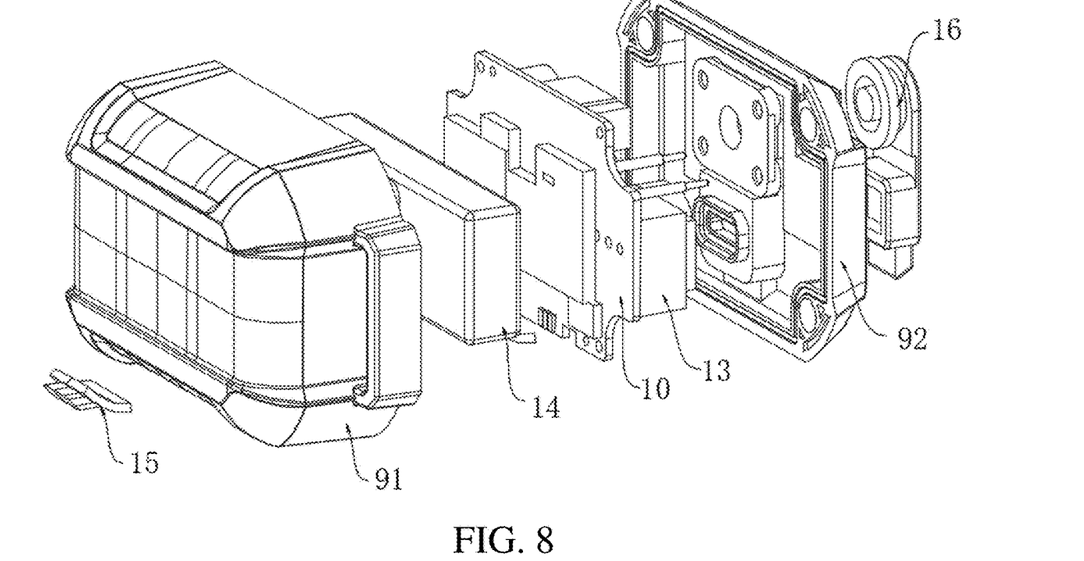
FIG. 8 is an exploded view of the receiver according to an embodiment of the present disclosure.
Figure 9:
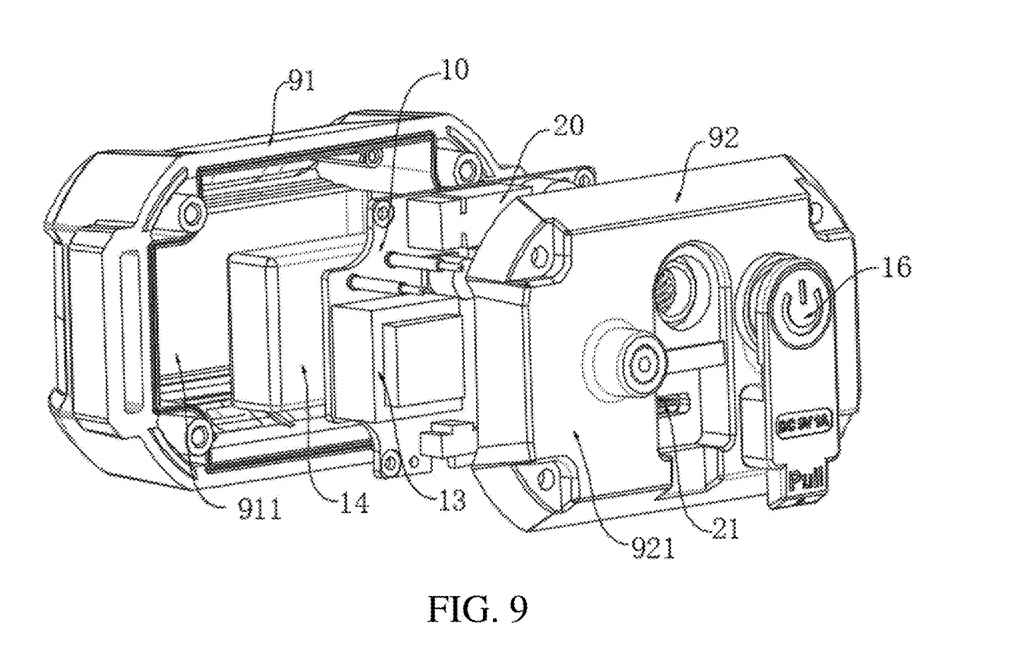
FIG. 9 is another exploded view of the receiver according to an embodiment of the present disclosure.

At least one receiver 200 is configured to be worn on a pet. The receiver 200 includes a second integrated circuit board 10. The second integrated circuit board 10 is arranged with a second radar module 101 and a second wireless transceiver module 102.

The first radar module 21 and the second radar module 101 are communicatively connected to each other perform measurement signal transmission to locate a location of the pet. The first wireless transceiver module 22 and the second wireless transceiver module 102 are communicatively connected to each other to perform instruction transmission and data feedback.

To be noted that, the first integrated circuit board 2 is arranged with the first radar module 21 and the first wireless transceiver module 22. The second integrated circuit board 10 is provided with the second radar module 101 and the second wireless transceiver module 102. Transmitting measurement signals between the transmitter 100 and the receiver 200 is achieved through the first radar module 21 and the second radar module 101, in order to locate in real time the location of the pet. At the same time, instruction signals are transmitted between the transmitter 100 and the receiver 200 through the first radar module 21 and the second radar module 101; and data are fed back between the transmitter 100 and the receiver 200 through the first radar module 21 and the second radar module 101. The instruction signals include setting a restricted range or a fence range, a warning manner to the pet, and so on. The data feedback includes the receiver 200 transmitting an operation state, such as a power level and so on, to the transmitter 100 to be displayed. In this way, signal processing in multi-frequency domains is achieved, resistance of different signals against interference is improved effectively, signal delay is reduced, and locating accuracy is improved. It is understood that the fence range is a region that the pet is restricted from leaving, and the restricted range is a region that the pet is not allowed to enter.

In an embodiment, as shown in FIGS. 1 and 2, the first integrated circuit board 2 is further arranged with a first processor module 27, the first processor module 27 is electrically connected to the first radar module 21 and the first wireless transceiver module 22.

The second integrated circuit board 10 is further arranged with a second processor module 107, the second processor module 107 is electrically connected to the second radar module 101 and the second wireless transceiver module 102.

To be noted that, each of the first processor module 27 and the second processor module 107 is a MCU processor. The first processor module 27 and the second processor module 107 interact the measurement signals with each other through the first radar module 21 and the second radar module 101; convert the measurement signals into digital signals; and perform calculations on the digital signals to locate the pet. The first processor module 27 and the second processor module 107 perform instruction transmission and data feedback to each other through the first wireless transceiver module 22 and the second wireless transceiver module 102. When the electric fence device is turned on, the first processor module 27 transmits instructions, such as the set restricted range or the fence range and the warning manner to the pet, to the second processor module 107, in order to enable the transmitter 100 and the receiver 200 to operate cooperatively with each other. When operating, the first processor module 27 compares, in real time, the location of pet with the preset fence range or the restricted range. When the pet is located out of the fence range or enters the restricted range, the first processor module 27 outputs a control instruction to the second processor module 107, the second processor module 107 controls the receiver 200 to give a warning to the pet. Furthermore, the second processor module 107 feeds back data collected from the receiver 200 to the first processor module 27, such that unified modulation is achieved.

In an embodiment of the present disclosure, as shown in FIGS. 1 and 2, each of the first radar module 21 and the second radar module 101 is a UWB radar. The first radar module 21 includes a first UWB antenna 23, the second radar module 101 includes a second UWB antenna 103. The first UWB antenna 23 and the second UWB antenna 103 form a first channel to transmit UWB signals.

To be noted that, in some embodiments, each of the first radar module 21 and the second radar module 101 is the UWB radar. For the electric fence device in the art, the location of the pet is monitored in real time by wireless GPS, wireless RSSI, wireless magnetic field, and so on. However, the above monitoring methods have respective drawbacks. In the method of monitoring the location of the pet by the wireless, an error in distance determination may be excessively large. In the method of monitoring the location of the pet by the wireless magnetic field, a boundary distance is limited, the error in distance determination may be excessively large, and a metal object may affect distance determination. In the method of monitoring the location of the pet by the wireless GPS, locating accuracy is poor, and the distance determination may be easily affected by signals. Therefore, for all of the above monitoring methods, the monitoring accuracy is poor. In the present disclosure, the UWB technology is applied to locate the pet. The UWB signal has an extremely narrow time domain, and locating based on the UWB signals have precision at a centimeter level. The UWB signal has a large bandwidth. A transmission power spectral density of the UWB signals is lower than that of noise. A probability of intercepting and interfering the UWB signals is significantly low. Therefore, the location of the pet can be accurately monitored, and the boundary of the fence range and the boundary of the restricted range may be defined accurately. When measuring the location, after the first processor module 27 and the second processor module 107 exchange the UWB signals to each other, Time-of-flight (TOF) calculation is performed. That is, a time length in which the UWB signals transmit between the transmitter 100 and the receiver 200 is measured, and then a distance is measured by a software algorithm, such that the location of the pet is monitored. Since the UWB signals are transmitted through the first channel specifically, the UWB signals are independently processed. In this way, responses to the UWB signals may be fast, location accuracy is improved, power consumption for monitoring based on the UWB signals is significantly reduced, and energy consumption of the transmitter 100 and the receiver 200 is optimized.

In an embodiment of the present disclosure, as shown in FIGS. 1 and 2, each of the first UWB antenna 23 and the second UWB antenna 103 is a patch antenna.

To be noted that, in some embodiments, each of the first UWB antenna 23 and the second UWB antenna 103 is the patch antenna. The first UWB antenna 23 is integrated on the first integrated circuit board 2, and the second UWB antenna 103 is integrated on the second integrated circuit board 10. By arranging the patch antennas, an external space of the transmitter 100 and the receiver 200 is not required for arranging antennas, such that appearances of the transmitter 100 and the receiver 200 are more concise. In addition, the patch antenna is small in size. Even if the patch antenna is disposed inside the transmitter 100 and the receiver, compared to other internal antennas, sizes of the transmitter 100 and the receiver 200 can still be reduced, such that a more compact structure of the device is achieved.

In an embodiment of the present disclosure, as shown in FIGS. 1 and 2, the first wireless transceiver module 22 includes a first communication antenna 24, the second wireless transceiver module 102 includes a second communication antenna 104. The first communication antenna 24 and the second communication antenna 104 form a second channel for transmitting instructions and feeding back data.

To be noted that, in some embodiments, each of the first wireless transceiver module 22 and the second wireless transceiver module 102 is a RF433 wireless module, such that each of the first communication antenna 24 and the second communication antenna 104 is a 433 antenna. By configuring the second channel for feeding back the data and transmitting instructions other than the UWB signals, signal processing in a plurality of frequency domains is achieved, resistance against interference on the same frequency domain is improved effectively. Signals of the RF433 wireless module have higher level of penetration. When a transmission power is large enough, long-distance transmission is achieved. In addition, in a normal operation mode, a wireless link is established only when data needs to be sent. Therefore, interference to other devices in a network is greatly reduced, and power consumption of the device itself is reduced. When a plurality of receivers 200 are arranged, the RF433 wireless module supports various wireless data communication methods, including point-to-point wireless data communication and one-to-multipoint wireless data communication. Therefore, transceiver integration, safety isolation, installation isolation, simple usage, a high quality-price, stability and reliability of the device can be achieved.

In an embodiment of the present disclosure, as shown in FIGS. 1 and 2, each of the first communication antenna 24 and the second communication antenna 104 is a spring antenna.

To be noted that, in some embodiments, each of the first communication antenna 24 and the second communication antenna 104 is the spring antenna. The first communication antenna 24 is soldered to the first integrated circuit board 2, and the second communication antenna 104 is soldered to the second integrated circuit board 10. The spring antenna has a low cost, a small size, and can be easily mounted. The spring antenna is vibration-proof and is resistant against aging, such that strength of the transmitted signals may be improved.

Figure 3:
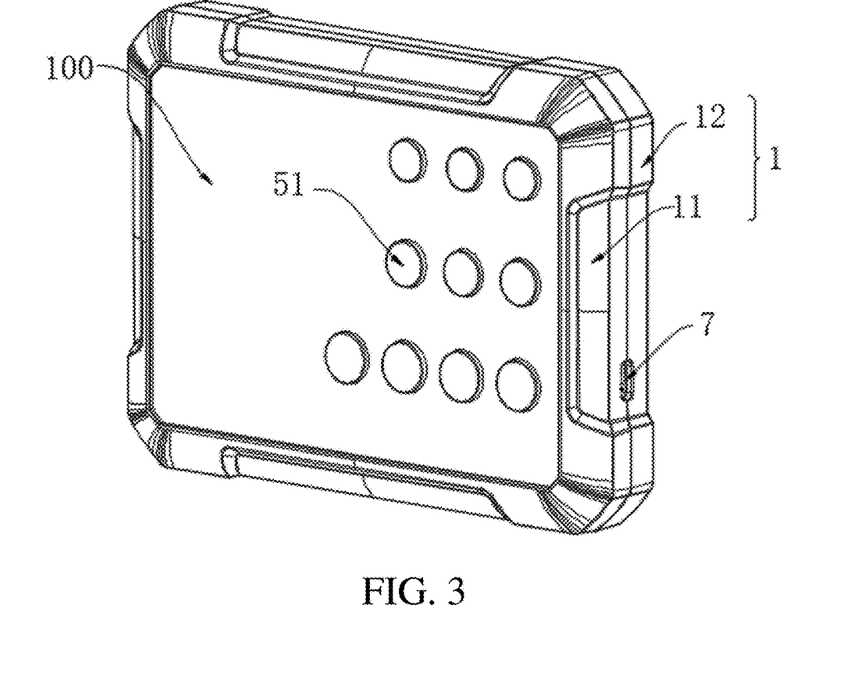
FIG. 3 is a structural schematic view of the transmitter according to an embodiment of the present disclosure.

In an embodiment of the present disclosure, as shown in FIGS. 3 and 5, the transmitter 100 further includes a first housing 1, the first housing 1 includes a first face housing 11 and a first bottom housing 12. The first face housing 11 and the first bottom housing 12 are disposed opposite to each other to cooperatively define a first receiving cavity 121, and the first integrated circuit board 2 is received in the first receiving cavity 121.

To be noted that the first face housing 11 and the first bottom housing 12 oppositely disposed by one or more of: snap fastening, riveting, and screwing, to form the first receiving cavity 121. The first integrated circuit board 2 is received in the first receiving cavity 121 to protect the first integrated circuit board 2.

In an embodiment of the present disclosure, as shown in FIGS. 3 and 5, the transmitter 100 further includes a keypad assembly 5, the keypad assembly 5 is disposed in the first receiving cavity 121. The keypad assembly 5 includes a plurality of keys 51. Each of the plurality of keys 51 extends through the first face housing 11, and the keypad assembly 5 is electrically connected to the first processor module 27. A user may input instruction signals via the plurality of keys 51.

To be noted that the keypad assembly 5 is disposed on a side of the first integrated circuit board 2 facing towards the first face housing 11 to be electrically connected to the first processor module 27. The keypad assembly 5 includes the plurality of keys 51, each key 51 extends through the first face housing 11 so as to be pressed by the user to set functions. That is, the user inputs, through the keys 51, the instruction signals to the first processor module 27. The instruction signals include the set fence range or the restricted range, and the warning manner, such that the user may perform operations easily.

In an embodiment of the present disclosure, as shown in FIGS. 3 and 5, the transmitter 100 further includes a display 4. The first face housing 11 defines an opening 111 at a position adjacent to the keypad assembly 5. The display 4 is received in the opening 111 and is electrically connected to the first processor module 27 to display operation states of the transmitter 100 and the receiver 200.

To be noted that the display 4 is a visual interface that allows the user to visualize, when pressing the keypad assembly 5 to input the instruction signals, the user's settings such as the set restricted range or the fence range and the warning method for the pet. In addition, when the display 4 is in use, the display 4 automatically displays various information, such as a current location of the pet, whether the pet is located within the fence range or enters the restricted range, and operation states of the receiver 200 and the transmitter 100, and so on. The display 4 is arranged to achieve visualization and improves usage experience.

In an embodiment of the present disclosure, as shown in FIGS. 1 and 5, the transmitter 100 further includes a first battery 3, the first battery 3 is received in the first receiving cavity 121. The first battery 3 is electrically connected to the first processor module 27 to collect and manage a battery state. A first charging port 7 is embedded in the first housing. The first charging port 7 is electrically connected to the first battery 3 to charge the first battery 3.

To be noted that the first integrated circuit board 2 is further arranged with a first battery management and charging module 25. The first battery 3 is electrically connected to the first processor module 27 via the first battery management and charging module 25. While power is being supplied, the first processor module 27 collects and manages the battery state of the first battery 3, and a battery level of the first battery 3 is disposed on the display 4. The first housing 1 is further arranged with the first charging port 7. In some embodiments, the first charging port 7 is a TYPE-C charging port. The first charging port 7 is electrically connected to the first battery 3 via the first battery management and charging module 25, such that charging protection is achieved. The first charging port 7 is further electrically connected to the first processor module 27. In this way, when charging is performed through the first charging port 7, the first processor module 27 monitors a voltage input and stops the other functions, only the charging and the displaying are operating.

In an embodiment of the present disclosure, as shown in FIG. 3, the transmitter 100 further includes a lens 6, the lens 6 covers a side 112 of the first face housing 11 away from the first bottom housing 12. The plurality of keys 51 extend through the lens 6.

To be noted that the lens 6 covers the display 4 and the keypad assembly 5, and the plurality of keys 51 extend through the lens 6. In this way, usage of the keypad assembly 5 is not affected. Arranging the lens 6 to cover the display 4 protects the display 4 from being damaged. The lens 6 and the first housing 1 may be arranged to have a conformed color scheme, such that the transmitter 100, in overall, may have a uniform and aesthetic appearance.

Figure 4:
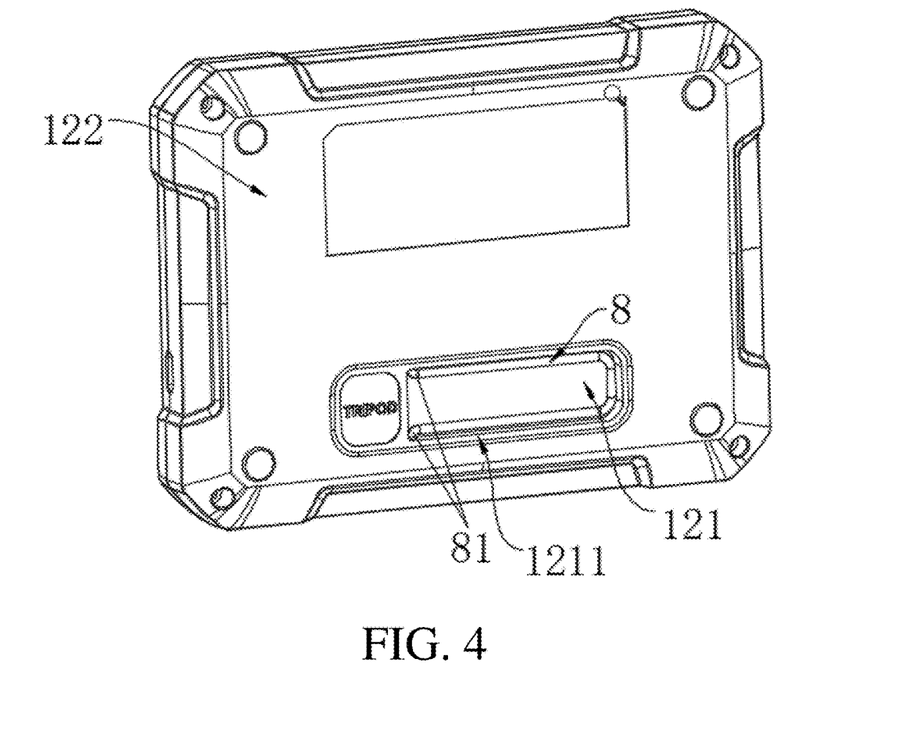
FIG. 4 is another structural schematic view of the transmitter according to an embodiment of the present disclosure.

In an embodiment of the present disclosure, as shown in FIG. 4, the transmitter 100 further includes a bracket 8, a rear side 122 of the first bottom housing 12 defines a recess 121. The bracket 8 is received in the recess 121 and is U-shaped. Two ends 81 of the bracket 8 are rotatably inserted in a side wall 1211 of the recess 121, such that the bracket 8 can be rotated out of the recess 121 to support the transmitter 100.

To be noted that, in some embodiments, the recess 121 is extending horizontally along a length direction of the transmitter 100 and is elongate-stripped shaped. The bracket 8 is U-shaped. The bracket 8 is received in the recess 121. The two ends 81 of the bracket 8 are rotatably inserted in the side wall 1211 of the recess 121. When the transmitter 100 is placed on a desktop or a carrying object, the bracket 8 is rotated to leave the recess 121 to be inclined relative to the transmitter 100 to support the transmitter 100, facilitating the user to use and view the display 4.

Figure 6:
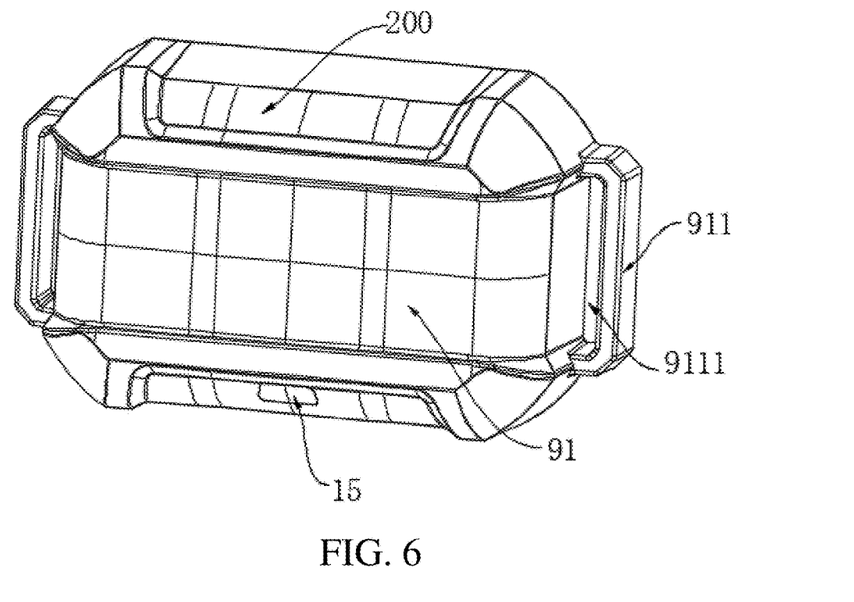
FIG. 6 is a structural schematic view of the receiver according to an embodiment of the present disclosure.

In an embodiment of the present disclosure, as shown in FIGS. 6 and 9, the receiver 200 includes a second housing 9, the second housing 9 includes a second face housing 91 and a second bottom housing 92. The second face housing 91 and the second bottom housing 92 are opposite to each other to cooperatively define a second receiving cavity 911. The second integrated circuit board 10 is received in the second receiving cavity 911.

To be noted that, similarly, the second face housing 91 and the second bottom housing 92 are arranged to be opposite to each other by one or more of: snap fitting, riveting, screwing, and so on, such that the second receiving cavity 911 is formed. The second integrated circuit board 10 is received in the second receiving cavity to protect the second integrated circuit board 10.

In an embodiment of the present disclosure, as shown in FIGS. 2 and 9, the receiver 200 further includes a vibration motor 20, the vibration motor 20 is arranged on the second integrated circuit board 10 and is electrically connected to the second processor module 107 for generating vibrations.

To be noted that the vibration motor 20 is arranged on the second integrated circuit board 10 and is electrically connected to the second processor module 107. When using the fence device, the user selects, by using the keypad assembly 5, a vibration manner to alarm. When the pet is located out of the fence range or enters the restricted range, the first processor module 27 transmits the instruction signals to the second processor module 107, the second processor module 107 drives the vibration motor 20 to vibrate, such that the pet is alerted.

Figure 7:
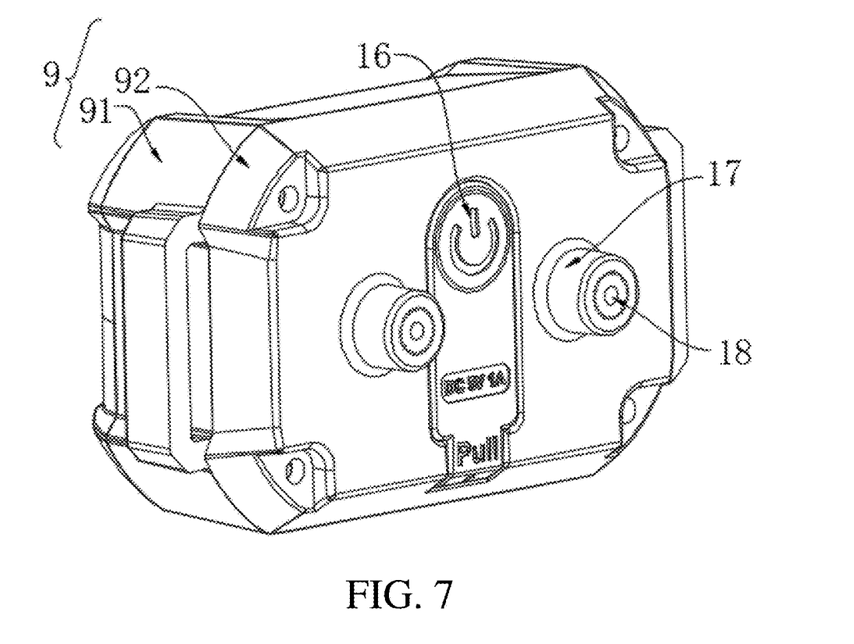
FIG. 7 is a structural schematic view of the receiver according to an embodiment of the present disclosure.

In an embodiment of the present disclosure, as shown in FIGS. 2 and 7, the receiver 200 further includes a transformer 13 and a plurality of electric shock posts 18. The transformer 13 is arranged on the second integrated circuit board 10 and is electrically connected to the second processor module 107. A rear side 921 of the second housing 92 is arranged with a plurality of columnar protrusions 17. Each of the plurality of electric shock posts 18 is inserted in a respective one of the plurality of columnar protrusions 17. Each electric shock post 18 is electrically connected to the transformer 13 to give an electric shock to the pet for alerting.

To be noted that the second processor module 107 is electrically connected to each electric shock post 18 through the transformer 13. Therefore, when the fence device is in use, the user selects, by using the keypad assembly 5, an electric shock manner to alarm. When the pet is located out of the fence range or enters the restricted range, the second processor module 107 receives the instruction signals from the first processor module 27 and drives the transformer 13 to output an alternating-current (AC) pulse high level, causing each electric shock post 18 to provide the electric shock to alert the pet.

In an embodiment of the present disclosure, as shown in FIGS. 1 and 2, the first integrated circuit board 2 is arranged with a first buzzer module 26, and the second integrated circuit board 10 is arranged with a second buzzer module 105. The first buzzer module 26 is electrically connected to the first processor module 27, and the second buzzer module 105 is electrically connected to the second processor module 107, such that each of the first buzzer module 26 and the second buzzer module 105 can sound a buzzer alarm.

To be noted that the receiver 200 is arranged with the second buzzer module 105, the second buzzer module 105 is electrically connected to the second processor module 107. Therefore, similarly, when the pet is located out of the fence range or enters the restricted range, the second processor module 107 receives the instruction signal from the first processor module 27 to drive the second buzzer module 105 to sound an alarm to the pet. In addition, the transmitter 100 is arranged with the first buzzer module 26, the first buzzer module 26 is electrically connected to the first processor module 27. Regardless of which kind of warning manner of the receiver 200 is set by the user, when the pet is located out of the fence range or enters the restricted range, the first processor module 27 always drive the first buzzer module 26 to sound the buzz alarm to inform the user to deal with a situation.

In an embodiment of the present disclosure, as shown in FIGS. 2 and 8, the receiver 200 further includes a second battery 14, the second battery 14 is received in the second receiving cavity 911. The second battery 14 is electrically connected to the second processor module 107 to collect and manage the battery state. The second housing 9 is embedded with a second charging port 21, the second charging port 21 electrically connected to the second battery 14 to charge the second battery 14.

To be noted that, similarly, the second integrated circuit board 10 is arranged with a second battery management and charging module 102. The second battery 14 is electrically connected to the second processor module 107 via the second battery management and charging module 10. When the power is being supplied, the second processor module 107 may collect and manage the battery state of the second battery 14 and may transmit a power level information of the second battery 14 to the first processor module 27 to be displayed on the display 4. The second housing 9 is further arranged with the second charging port 21, the second charging port 21 is electrically connected to the second battery 14 via the second battery management and charging module 102, such that charging protection is achieved. The second charging port 21 is further electrically connected to the second processor module 107. In this way, when the battery is being charged through the second charging port 21, the second processor module 107 monitors a voltage input and stops other functions, and only the charging and the displaying are operating.

In an embodiment of the present disclosure, as shown in FIGS. 2, 7, 8, and 9, the receiver 200 further includes a function button 16, the function button 16 is arranged on the second housing 9 and extends through the second housing 9 to be electrically connected to the second processor module 107. In this way, the user is enabled to press the function button 16 to switch on and off the receiver 200 to allow the receiver 200 to be paired with the transmitter 100.

To be noted that, in some embodiments, the function button 16 is arranged at the rear side 921 of the second bottom housing 92, and the second charging port 21 is also arranged at the rear side 921 of the second bottom housing 92. A push-pull layer is arranged out of the second charging port 21, such that the function button 16 and the second charging port 21 may be prevented from being damaged due to liquid contact when the pet contacts liquids. The function button 16 is configured as a switching-on/off key. The function button 16 controls the receiver 200 to be switched on/off; and at the same time, regulates, by being pressed, pairing between the receiver 200 and the transmitter 100. Therefore, the receiver 200 can be operated easily.

In an embodiment of the present disclosure, as shown in FIGS. 2, 6 and 8, the receiver 200 further includes an indicator light 15, the indicator light 15 is embedded in the second housing 9. The indicator light 15 is electrically coupled with the second processor module 107, and different displaying states may be switched to illuminate to indicate: the power level of the second battery 14, a charging state of the second battery 14, and a pairing state between the transmitter 100 and the receiver 200.

To be noted that, in some embodiments, the indicator light 15 is embedded in the second face housing 91, and an outer surface of the indicator light 15 is flushed with an outer surface of the second face housing 91. The indicator light 15 includes at least a red light and a green light. When the receiver 200 is in the charging state, in a fully-charged state, an out-of-power state, a paired state, and so on, the second processor module 107 sends instructions corresponding to each state to drive the red light or the green light to illuminate to indicate the respective state, such that the user is informed of the state by observing the light.

In an embodiment of the present disclosure, as shown in FIG. 6, the second housing 9 is arranged with at least one fixing member 911, and a gap 9111 is defined between the fixing member 911 and the second housing 9, such that the second housing 9 can be configured on a collar to be worn to the pet.

To be noted that, in some embodiments, two fixing members 911 are arranged and are respectively disposed on two ends of the second housing 9 along the length direction. In this way, after being configured to the collar, the receiver 200 may be fixed to the collar, and therefore, the receiver 200 is worn to a neck of the pet and does not impact movements of the pet.

To be noted that the above technical features can be further combined with each other to form various more embodiments which are not listed in the above, and the more embodiments are within the scope of the present disclosure. Furthermore, any ordinary skilled person in the art may perform improvement or transformation according to the above specification, and the improvement and the transformation shall fall within the scope of the claims of the present application.

What is claimed is:

1. An electric fence device, comprising:
a transmitter, comprising a first integrated circuit board; wherein, the first integrated circuit board is arranged with a first radar module and a first wireless transceiver module; and
at least one receiver, configured to be worn on a pet; wherein, each of the at least one receiver comprises a second integrated circuit board; the second integrated circuit board is arranged with a second radar module and a second wireless transceiver module;
wherein, the first radar module and the second radar module are communicatively connected to each other to perform measurement signal transmission to determine a location of the pet; the first wireless transceiver module and the second wireless transceiver module are communicatively connected to each other to perform instruction signal transmission and data feedback.

2. The electric fence device according to claim 1, wherein, the first integrated circuit board is further arranged with a first processor module, the first processor module is electrically connected to the first radar module and the first wireless transceiver module;
the second integrated circuit board is further arranged with a second processor module, the second processor module is electrically connected to the second radar module and the second wireless transceiver module.

3. The electric fence device according to claim 1, wherein, each of the first radar module and the second radar module is a UWB radar; the first radar module comprises a first UWB antenna; the second radar module comprises a second UWB antenna; the first UWB antenna and the second UWB antenna form a first channel to transmit UWB signals.

4. The electric fence device according to claim 3, wherein each of the first UWB antenna and the second UWB antenna is a patch antenna.

5. The electric fence device according to claim 1, wherein, the first wireless transceiver module comprises a first communication antenna, the second wireless transceiver module comprises a second communication antenna; the first communication antenna and the second communication antenna form a second channel for performing the instruction signal transmission and the data feedback.

6. The electric fence device according to claim 5, wherein, each of the first communication antenna and the second communication antenna is a spring antenna.

7. The electric fence device according to claim 2, wherein, the transmitter further comprises a first housing; the first housing comprises a first face housing and a first bottom housing; the first face housing and the first bottom housing are disposed opposite to each other to cooperatively define a first receiving cavity; the first integrated circuit board is received in the first receiving cavity.

8. The electric fence device according to claim 7, wherein, the transmitter further comprises a keypad assembly, the keypad assembly is received in the first receiving cavity; the keypad assembly comprises a plurality of keys, each of the plurality of keys extends through the first face housing; the keypad assembly is electrically connected to the first processor module, the plurality of keys are configured to be pressed by a user to input instruction signals.

9. The electric fence device according to claim 7, wherein, the transmitter further comprises a display; the display is received in an opening defined in the first face housing; the display is electrically connected to the first processor module to display operation states of the transmitter and the receiver.

10. The electric fence device according to claim 7, wherein, the transmitter further comprises a first battery; the first battery is received in the first receiving cavity; the first battery is electrically connected to the first processor module to collect and manage a battery state; a first charging port is embedded in the first housing; the first charging port is electrically connected to the first battery to charge the first battery.

11. The electric fence device according to claim 8, wherein, the transmitter further comprises a lens; the lens covers a side of the first face housing away from the first bottom housing; the plurality of keys extend through the lens.

12. The electric fence device according to claim 7, wherein, the transmitter further comprises a bracket; a rear side of the first bottom housing defines a recess; the bracket is received in the recess and is U-shaped; two ends of the bracket are rotatably inserted in a side wall of the recess; the bracket is capable of being rotated out of the recess to support the transmitter.

13. The electric fence device according to claim 2, wherein, the receiver comprises a second housing; the second housing comprises a second face housing and a second bottom housing; the second face housing and the second bottom housing are opposite to each other to cooperatively define a second receiving cavity; the second integrated circuit board is received in the second receiving cavity.

14. The electric fence device according to claim 13, wherein, the receiver further comprises a vibration motor; the vibration motor is arranged on the second integrated circuit board: the vibration motor is electrically connected to the second processor module and is configured to generate vibration.

15. The electric fence device according to claim 13, wherein, the receiver further comprises a transformer and a plurality of electric shock posts; the transformer is arranged on the second integrated circuit board and is electrically connected to the second processor module; a rear side of the second housing is arranged with a plurality of columnar protrusions; each of the plurality of electric shock posts is inserted in a respective one of the plurality of columnar protrusions; each electric shock post is electrically connected to the transformer to give an electric shock to the pet for alerting.

16. The electric fence device according to claim 2, wherein, the first integrated circuit board is arranged with a first buzzer module; the second integrated circuit board is arranged with a second buzzer module; the first buzzer module is electrically connected to the first processor module; the second buzzer module is electrically connected to the second processor module; each of the first buzzer module and the second buzzer module is configured to sound a buzzer alarm.

17. The electric fence device according to claim 13, wherein, the receiver further comprises a second battery; the second battery is received in the second receiving cavity; the second battery is electrically connected to the second processor module to collect and manage a battery state of the second battery; the second housing is embedded with a second charging port; the second charging port electrically connected to the second battery to charge the second battery.

18. The electric fence device according to claim 13, wherein, the receiver further comprises a function button; the function button is arranged on the second housing and extends through the second housing to be electrically connected to the second processor module; the function button is configured to be pressed by a user to switch on and off the receiver and to enable or disenable paring between the receiver and the transmitter.

19. The electric fence device according to claim 13, wherein, the receiver further comprises an indicator light; the indicator light is embedded in the second housing; the indicator light is electrically coupled with the second processor module to enable a plurality of displaying states to be switched to illuminate to indicate; a power level of the second battery, a charging state of the second battery, and a pairing state between the transmitter and the receiver.

20. The electric fence device according to claim 13, wherein, the second housing is arranged with at least one fixing member, and a gap is defined between the fixing member and the second housing to enable the receiver to be configured on a collar to be worn to the pet.

* * * * *